US012671633B2

(12) United States Patent
Cociglio

(10) Patent No.: US 12,671,633 B2
(45) Date of Patent: Jun. 30, 2026

(54) PERFORMANCE MEASUREMENT OF PACKET FLOW IN A PACKET-SWITCHED COMMUNICATION NETWORK BY A USER COMMUNICATION DEVICE

(71) Applicant: TELECOM ITALIA S.p.A., Milan (IT)

(72) Inventor: Mauro Cociglio, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 276 days.

(21) Appl. No.: 17/999,716

(22) PCT Filed: May 26, 2021

(86) PCT No.: PCT/EP2021/064106
§ 371 (c)(1),
(2) Date: Nov. 23, 2022

(87) PCT Pub. No.: WO2021/239841
PCT Pub. Date: Dec. 2, 2021

(65) Prior Publication Data
US 2023/0239225 A1 Jul. 27, 2023

(30) Foreign Application Priority Data

May 27, 2020 (IT) ........................ 102020000012526

(51) Int. Cl.
*H04L 41/00* (2022.01)
*H04L 43/028* (2022.01)
*H04L 43/08* (2022.01)
(52) U.S. Cl.
CPC ............ *H04L 41/24* (2013.01); *H04L 43/028* (2013.01); *H04L 43/08* (2013.01)
(58) Field of Classification Search
CPC .............................. H04L 43/028; H04L 43/08
(Continued)

(56) References Cited

U.S. PATENT DOCUMENTS

2007/0242620 A1* 10/2007 Zhai ..................... H04L 43/0888
370/252
2008/0052394 A1* 2/2008 Bugenhagen ........... H04L 45/28
709/224
(Continued)

FOREIGN PATENT DOCUMENTS

WO WO 2011/037536 A1 3/2011

OTHER PUBLICATIONS

Cociglio, New Spin bit enabled measurements with one or two more bits, internet draft draft-cfb-ippm-spinbit-new-measurements-00, IPPM working group, Feb. 28, 2019 (Year: 2019).*
(Continued)

*Primary Examiner* — Nicholas R Taylor
*Assistant Examiner* — Chong G Kim
(74) *Attorney, Agent, or Firm* — Oblon, McClelland, Maier & Neustadt, L.L.P.

(57) ABSTRACT

It is disclosed a performance measurement application for a user communication device. The device runs at least one user application which exchanges at least one packet flow with a packet-switched communication network. When executed, the performance measurement application receives from an owner of the user communication device a request for performing a performance measurement. In response to such request, the performance measurement application activates a marking functionality comprising marking upstream packets of the packet flow to be measured and inducing the network node originating the downstream packets of the packet flow to be measured to mark them. The performance measurement application then provides performance parameter(s) relating to the marked upstream packets as transmitted and/or the marked downstream packets as received and, based on such parameter(s), provides a per-
(Continued)

formance measurement. The measurement results are then shared with a measurement management server.

16 Claims, 3 Drawing Sheets

(58) Field of Classification Search
USPC ........................................................ 370/252
See application file for complete search history.

(56) References Cited

U.S. PATENT DOCUMENTS

| 2013/0242752 | A1* | 9/2013 | Underwood | .......... H04W 24/02 |
| | | | | 370/241 |
| 2017/0346714 | A1* | 11/2017 | Mizrahi | .............. H04L 43/0858 |
| 2018/0124629 | A1* | 5/2018 | Wang | ....................... H04L 43/04 |
| 2019/0058649 | A1 | 2/2019 | Qi et al. | |
| 2021/0006642 | A1* | 1/2021 | He | ........................... H04L 43/16 |
| 2021/0399965 | A1* | 12/2021 | Le Maigat | .......... H04L 43/0811 |
| 2023/0114176 | A1* | 4/2023 | Xiong | ..................... H04L 43/10 |
| | | | | 709/224 |

OTHER PUBLICATIONS

Trammell, The Quic Latency Spin Bit, internet draft draft-ietf-quic-spin-exp-latest, Quic WG, Jun. 28, 2019 (Year: 2019).*

International Search Report Issued Jul. 16, 2021, in PCT/EP2021/064106, filed on May 26, 2021, 4 pages.
B. Trammel et al., "The Addition of a Spin Bit to the QUIC Transport Protocol draft-trammell-quic-spin-01", QUIC, Internet-Draft, Expires Jun. 16, 2018, 25 pages.
M. Cociglio et al., "New Spin bit enabled measurements with one or two more bits", Internet Draft, Jul. 2019, 18 pages.
A. Ferrieux et al., "Packet Loss Signaling for Encrypted Protocols", Internet Draft, 24 pages.
M. Cociglio et al., Cociglio Telecom Italia G Fioccola Huawei, "Client-Server Explicit Performance Measurements; draft-cfb-ippm-spinbit-measurements-01" Internet-Draft, Mar. 2020, pp. 1-25, XP015138816, Retrieved from the Internet: URL:https://tools.ietf.org/html/draft-cfb-ippm-spinbit-measurements-01 [retrieved on Mar. 23, 2020], p. 1, line 1—p. 23, line 8.
Kurt Baumann et al., "WiFiMon App Measuring Wi-Fi Performance as Experienced by End-Users", 2017 24th International Conference on Telecommunications (ICT), IEEE, May 3, 2017, pp. 1-5, XP033135861, DOI: 10.1109/ICT.2017.7998257 p. 1, line 1—p. 5, right-hand column line 11.
M. Cociglio et al., cociglio telecom italia Huawei, "User Devices Explicit Monitoring; draft-cnbf-ippm-user-devices-explicit-monitoring-00", IPPM, Internet Draft, Expires Apr. 30, 2021, pp. 1-6, XP015142340, Retrieved from the Internet: URL:https://tools.ietf.org/html/draft-cnbf-ippm-user-devices-explicit-monitoring-00 [retrieved on Oct. 27, 2020], the whole document.
Chinese Office Action issued Sep. 14, 2024, in Chinese Patent Application No. 202180044248.6 (with English translation), 19 pages.

* cited by examiner

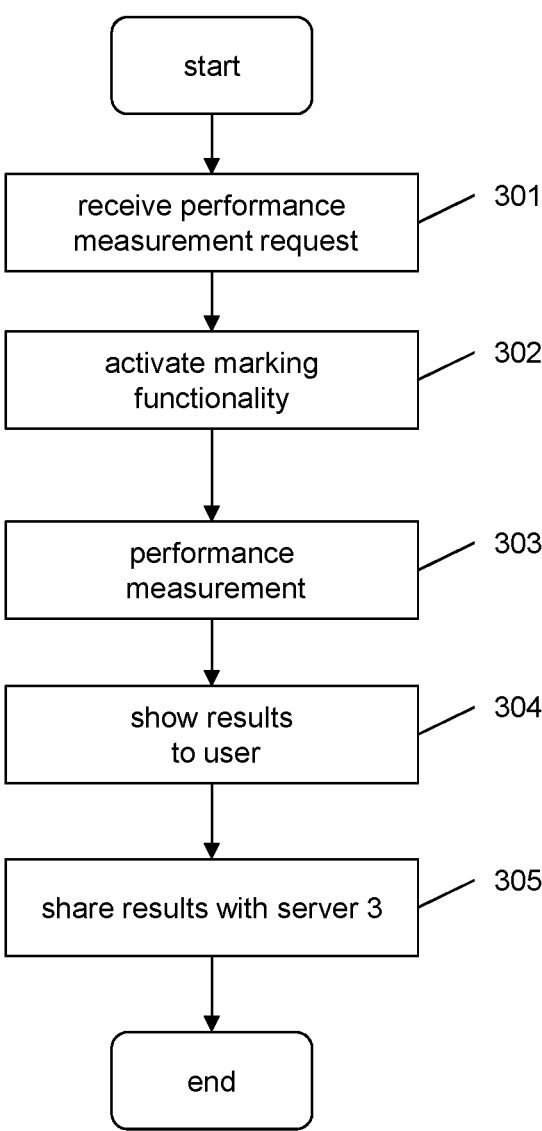
<u>Fig. 3</u>

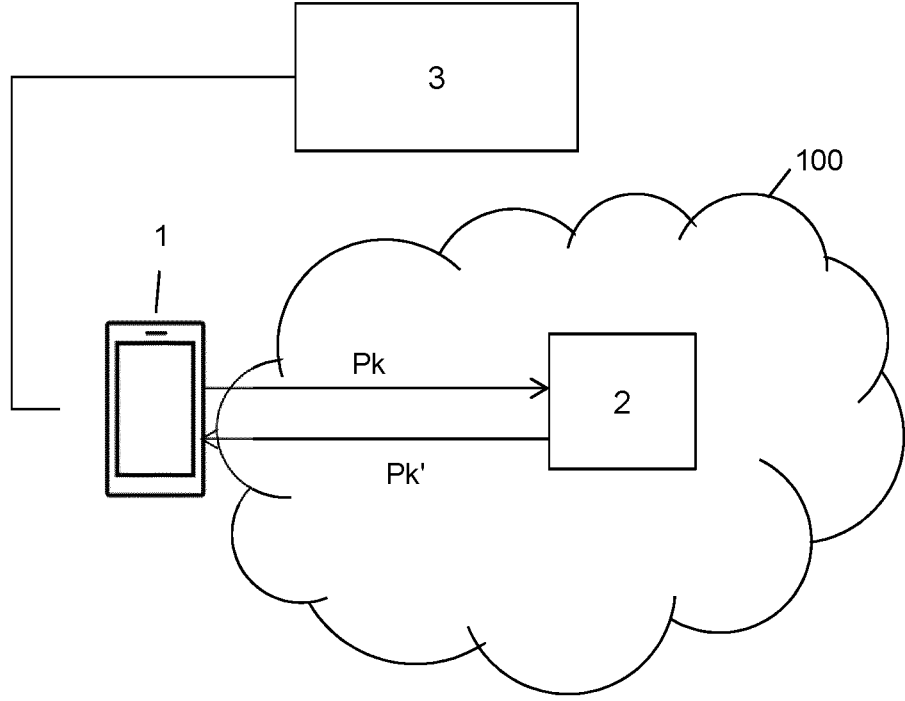
<u>Fig. 4</u>

PERFORMANCE MEASUREMENT OF PACKET FLOW IN A PACKET-SWITCHED COMMUNICATION NETWORK BY A USER COMMUNICATION DEVICE

TECHNICAL FIELD

The present invention relates to the field of communication networks. In particular, the present invention relates to a computer program product, a system and a method for performing a performance measurement by a user communication device connected to a packet-switched communication network.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks. IP networks may support QUIC (Quick UDP Internet Connections), which is a transport layer (layer 4) network protocol designed to support multiplexed connections between two endpoints (client and server) over User Datagram Protocol (UDP).

Performance of a packet switched communication network is typically measured in terms of packet loss and/o delay and/or jitter. These measurements may be either one-way or round-trip.

Measurement techniques are known which operate directly on the packet flows carrying user data, without requiring the transmission of any artificial packet (such as ping packets) dedicated for measurement purpose. These techniques typically provide for marking the packets of the packet flow to be measured and for deploying one or more measurements points on the path of the marked packets. Each measurement point provides one or more performance parameters relating to the marked packets (typically counters and/or timestamps) which are then used to determine the performance of that packet flow. Some of these techniques require a single measurement point to be implemented on the path of the marked packets, the measurement point being capable of autonomously determining a performance measurement (e.g. a packet loss measurement or a delay measurement) based on its own performance parameter(s) (namely, without using performance parameter(s) provided by other measurement points).

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which enables RTT (round-trip time) measurements between client and server of a QUIC connection by a measurement point located on the connection.

M. Cociglio et al.: Internet Draft "New Spin bit enabled measurements with one or two more bits draft-cfb-ippm-spinbit-new-measurements-01", Jul. 1, 2019 describes the addition of a so-called Loss bit in the QUIC header, which enables round-trip packet loss measurements between client and server of a QUIC connection by a measurement point located on the connection.

A. Ferrieux et al.: Internet Draft "Packet Loss Signaling for Encrypted Protocols draft-ferrieuxhamchaoui-quic-loss-bits-03", Jan. 16, 2020 describes an extension of the QUIC protocol introducing two bits in the packet header, namely a Q bit (sQuared signal bit) and an L bit (Loss event bit), which enable different types of one-way packet loss measurements (including end-to-end measurements, upstream measurements and downstream measurement) by a measurement point located on the connection.

SUMMARY OF THE INVENTION

The Applicant has noticed that providing a performance measurement (e.g. by any of the above known techniques) which is indicative of the actual overall performance of a packet-switched network and, at the same time, provides results with the desired granularity, requires monitoring all the packet flows transmitted through the network, or at least a significant portion thereof. Since a node of a communication network is typically crossed by several packet flows, a measurement point implemented at a network node shall be configured to detect several packet flows and provide performance measurements relating to each one of them. This would require a huge computational effort by the measurement point.

Besides, the choice of the nodes at which measurement points shall be implemented so as to guarantee that all the packet flows (or at least a significant portion thereof) are monitored is also complex.

In view of the above, the Applicant has perceived the need to provide a technique for performing a performance measurement of a packet-switched communication network, which overcomes or mitigates the aforesaid drawback.

In particular, the Applicant has tackled the problem of providing a technique for performing a performance measurement of a packet-switched communication network, which does not require the deployment of a complex scheme of measurement points capable of detecting several packet flows at the network nodes.

According to embodiments of the present invention, this problem is solved by a computer program product (also termed "performance measurement application" in the following description) suitable for installation on a user communication device (such as a smartphone, a PC, a tablet, a IoT device, etc.). The user communication device is provided with at least one user application (e.g. browser, videoconferencing app, social network app, e-commerce app, e-banking app, etc.) configured to exchange at least one packet flow (typically, a bidirectional packet flow) with the packet-switched communication network. When the performance measurement application is run by the user communication device, it may receive from the device owner a request for performing a performance measurement on the packet flow exchanged by the user application. In response thereto, the performance measurement application activates a marking functionality on the packet flow, which comprises marking the upstream packets of the packet flow to be measured and inducing the network node which is being originating the downstream packets of the packet flow to be measured to consistently mark the downstream packets. The performance measurement application then detects the marked upstream packets as transmitted by the user communication device and/or the marked downstream packets as received by the user communication device, provides at least one performance parameter relating thereto (e.g. a counter or a timestamp) and provides a performance measurement based on such performance parameter. The performance measurement application then shares the measurement results with a measurement management server.

In the present description and in the claims, the expression "marking a packet" or "marking a packet flow" will designate an operation of setting the value of one or more measurement-dedicated fields in the packet or in each packet of the packet flow, so as to support a performance measurement. The number of measurement-dedicated fields, their position within the packet and the marking rule depend on the protocol whereby the packets are formatted and the type of performance measurement. By way of non-limiting example, if a packet flow to be measured is formatted according to the QUIC protocol, the measurement-dedicated field(s) may comprise the spin bit as disclosed by the above known Internet draft of B. Trammel et al. and/or the Loss bit disclosed by the above known Internet draft of M. Cociglio et al. and/or the Q bit and L bit disclosed by the above known Internet draft of A. Ferrieux et al.

The performance measurement application according to embodiments of the present invention then advantageously acts as a measurement point capable of autonomously monitoring any of (or even all) the packet flows that the user communication device exchanges with the packet-switched communication network. Since, typically, a user communication device makes use of a limited number of user applications exchanging a limited number of packet flows, the maximum number of packet flows to be measured by the performance measurement application is also limited and can be managed by the computational resources that are typically available at a user communication device.

Hence, if the performance measurement application were installed on several user communication devices, a corresponding number of measurement points would be available, which would provide to the measurement management server performance measurements for several packet flows transmitted through the network. The performance measurement application and the measurement management server then form a performance measurement system capable of monitoring all the packet flows transmitted through the network, or at least a significant portion thereof, while significantly reducing the number of measurement points to be deployed at the network nodes and their complexity (in terms of number of packet flows to be monitored by each measurement point).

According to a first aspect, the present invention provides a computer program product for a user communication device, the user communication device being provided with at least one user application suitable for exchanging at least one packet flow with a packet-switched communication network, the computer program product comprising instructions which, when the program is executed by a processor of the user communication device, cause the processor of the user communication device to carry out the following steps:
    a) receiving from an owner of the user communication device a request for performing a performance measurement on the packet flow;
    b) in response to the request, activating a marking functionality on the packet flow, the marking functionality comprising marking upstream packets of the packet flow and inducing a network node of the packet-switched communication network originating downstream packets of the packet flow to mark the downstream packets;
    c) providing at least one performance parameter relating to the marked upstream packets as transmitted by the user communication device and/or the marked downstream packets as received by the user communication device and, based on the at least one performance parameter, providing a performance measurement on the packet flow; and
    d) sharing the performance measurement with a measurement management server.

According to some embodiments, the marking functionality is embedded in the user application and step b) comprises instructing the user application to activate the marking functionality.

According to other embodiments, at step b) the marking functionality is implemented by the computer program product itself.

Preferably, at step b) marking the upstream packets of the packet flow comprises setting the value of at least one measurement-dedicated field in the upstream packets and the inducing a network node of the packet-switched communication network originating downstream packets of the packet flow to mark the downstream packets comprises inducing the network node to set the value of at least one measurement-dedicated field in the downstream packets.

Optionally, the upstream and downstream packets comprise at least two measurement-dedicated fields supporting at least two respective types of performance measurements and: step a) comprises receiving from the owner of the user communication device a request for performing a type of performance measurement selected amongst the at least two types of performance measurements and steps b) and c) are performed on the measurement-dedicated field supporting the selected type of performance measurement.

According to some embodiments, the user application is suitable for exchanging a plurality of packet flows and: step a) comprises receiving from the owner of the user communication device a request for performing a performance measurement on at least one packet flow selected amongst the plurality of packet flows and steps b) and c) are performed only for the selected at least one packet flow.

According to some embodiments, step a) comprises receiving from the owner a request for performing a performance measurement on all the packet flows exchanged by all the user applications run by the user communication device and steps b) and c) are performed on all the packet flows exchanged by all the user applications run by the user communication device.

Optionally, steps b) and c) are performed on all the packet flows exchanged by all the user applications run by the user communication device, except at least one packet flow complying with a filtering criterion selected by the owner.

Optionally, step d) comprises completing the shared performance measurement with information identifying at least one of the user communication device, the packet flow, and said user application.

Preferably, the computer program product comprises further instructions which, when the program is executed by the processor of the user communication device, cause the processor of the user communication device to carry out the following step:
    e) sharing the performance measurement with the owner of the user communication device.

The computer program product may be downloadable and installable on the user communication device upon request from the owner.

Alternatively, the computer program product is part of the operating system of the user communication device.

According to a second aspect, the present invention provides a method for performing a performance measurement on a packet-switched communication network at a user communication device, the user communication device being provided with at least one user application suitable for exchanging at least one packet flow with the packet-switched communication network, the method comprising:

a) receiving from an owner of the user communication device a request for performing a performance measurement on the packet flow;

b) in response to the request, activating a marking functionality on the packet flow, the marking functionality comprising marking upstream packets of the packet flow and inducing a network node of the packet-switched communication network originating downstream packets of the packet flow to mark the downstream packets;

c) providing at least one performance parameter relating to the marked upstream packets as transmitted by the user communication device and/or the marked downstream packets as received by the user communication device and, based on the at least one performance parameter, providing a performance measurement on the packet flow; and d) sharing the performance measurement with a measurement management server.

According to a third aspect, the present invention provides a system for performing a performance measurement on a packet-switched communication network, the system comprising a measurement management server and at least one user communication device provided with at least one user application suitable for exchanging at least one packet flow with a packet-switched communication network, the at least one user communication device being further configured to:

receive from an owner of the user communication device a request for performing a performance measurement on the packet flow;

in response to the request, activate a marking functionality on the packet flow, the marking functionality comprising marking upstream packets of the packet flow and inducing a network node of the packet-switched communication network originating downstream packets of the packet flow to mark the downstream packets;

provide at least one performance parameter relating to the marked upstream packets as transmitted by the user communication device and/or the marked downstream packets as received by the user communication device and, based on the at least one performance parameter, provide a performance measurement on the packet flow; and share the performance measurement with the measurement management server.

BRIEF DESCRIPTION OF THE DRAWINGS

The present invention will become clearer from the following detailed description, given by way of example and not of limitation, to be read with reference to the accompanying drawings, wherein:

FIG. 3 is a flow chart of the operation of the performance management application, according to embodiments of the present invention; and FIG. 4 schematically shows the architecture of a performance measurement system including the performance measurement application and a measurement management server according to embodiments of the present invention.

DETAILED DESCRIPTION OF PREFERRED EMBODIMENTS OF THE INVENTION

Figure 1:
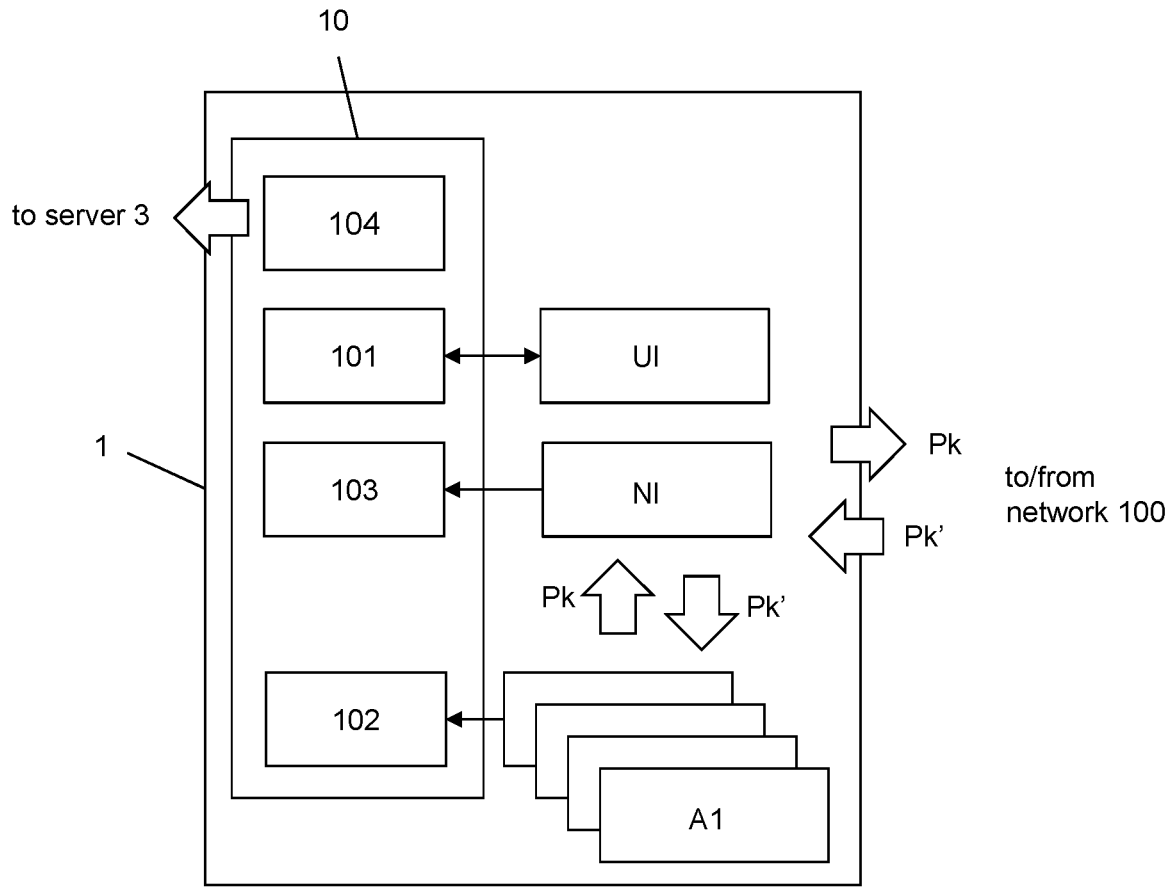
FIG. 1 schematically shows a user communication device provided with a performance measurement application according to embodiments of the present invention.

FIG. 1 schematically shows a user communication device provided with a performance measurement application according to embodiments of the present invention.

The user communication device, designated by reference numeral 1 in FIG. 1, may be a PC, a smartphone, a tablet, an IoT (Internet of Things) device or any other device provided with the capability of connecting to a packet-switched communication network 100 (as shown in FIG. 4), typically via an access network. The connectivity may be wired or wireless (e.g. Wi-Fi or mobile). The user communication device 1 may be either a personal device (typically, its user is also its owner) or a business device (typically, its owner is a natural person or legal person other than its user). In general, the term "owner" is used in the present application and in the claims to indicate the entity who has the right and/or the material possibility to install and operate applications or other software on the user device or otherwise has rights over the user device.

The user communication device 1 is provided with at least one user application A1 configured to provide the device 1 with a communication service offered by a service provider, such as for example a web browsing service, a videoconferencing service, a multimedia streaming service, an e-commerce service, an e-banking service and so on. The user communication device 1 may comprise several user applications providing different communication services.

The user application A1 (as well as the other user applications of the device 1, if any) supports provision of the respective communication service by exchanging a flow of user packets with the packet-switched communication network 100, in particular with a network node 2 (typically, a server of a service provider) as shown in FIG. 4. The packet flow typically is bidirectional, namely it comprises both upstream packets Pk (namely, packets transmitted from the device 1 to the network 100) and downstream packets Pk' (namely, packets transmitted from the network 100 to the device 1).

The user application A1 originates the upstream packets Pk to be transmitted to the network node 2 and terminates the downstream packets Pk' received from the network node 2. Transmission of the upstream packets Pk and reception of the downstream packets Pk' is performed by a network interface NI comprised in the user communication device 1.

Figure 2:
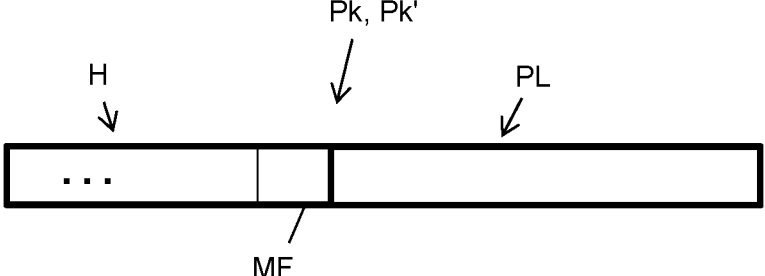
FIG. 2 schematically shows the structure of a packet transmitted or received by the user communication device of FIG. 1, according to embodiments of the present invention.

As schematically depicted in FIG. 2, each packet Pk, Pk' exchanged by the user application A1 comprises a payload PL comprising user data and at least one header H. In case of multiple headers, each header pertains to a different network layer. For example, each packet Pk, Pk' may comprise a network layer header (such as an IP header) and transport layer header (such as a QUIC header or a TCP header).

One of the headers H (typically, the network layer header) comprises packet forwarding information, namely information allowing the upstream packets Pk generated by the user communication device 1 to reach the network node 2 and the downstream packets Pk' generated by the network node 2 to reach the user communication device 1.

Each packet Pk, Pk' also preferably comprises at least one measurement dedicated field MF (also termed herein after "marking field") supporting at least one type of performance measurement on the packet flow Pk, Pk'. The marking field(s) MF may be comprised in the same header H as the packet forwarding information (as shown in FIG. 2), in a different header (if any) or in the payload PL. Assuming for example that the packets Pk, Pk' comprise a network layer header (such as an IP header) and a transport layer header (such as a QUIC header), the marking field(s) MF may be comprised in the transport layer header.

The number of marking fields and their position within the packets Pk, Pk' depend on the protocol(s) according to which the packets are formatted and the type of supported performance measurement(s). By way of non-limiting example, if the packets Pk, Pk' are formatted according to the QUIC protocol, the marking field(s) MF may be in the QUIC header and may comprise (i) a spin bit supporting an RTT measurement as per the above Internet draft of B. Trammel et al. and/or (ii) a Loss bit supporting a round-trip packet loss measurement as per the above Internet draft of M. Cociglio et al. and/or (iii) a Q bit and an L bit supporting different types of one-way packet loss measurements as per the above Internet draft of A. Ferrieux et al.

According to embodiments of the present invention, the user communication device 1 comprises a performance measurement application 10. The performance measurement application 10 may be downloaded and installed on the user communication device 1, or it may be part of the operating system of the user communication device 1.

The performance measurement application 10 preferably comprises an owner management module 101, a marking management module 102, a measurement module 103 and a sharing module 104.

The owner management module 101 is preferably configured to receive from the owner of the device 1 performance measurement requests whereby the owner of the device 1 requests to start a performance measurement on the packet flow(s) exchanged by one or more user applications run by the user communication device 1. The owner management module 101 is also preferably configured to provide the measurement results to the owner of the device 1.

The marking management module 102 is preferably configured to, in response to a performance measurement request requesting a performance measurement on a packet flow exchanged by a user application, activate a marking functionality on that packet flow. The measurement module 103 is preferably configured to detect the marked packets of the packet flow as transmitted and/or received by the user communication device 1 via its network interface NI and provide one or more performance parameters (e.g. timestamps and/or counters) relating thereto. The measurement module 103 is also configured to autonomously calculate a performance measurement based on such performance parameter(s).

The sharing module 104 is preferably configured to share at least part of the measurement results provided by the measurement module 103 with one or more measurement management servers 3, as depicted in FIG. 4. The measurement management server(s) 3 may include server(s) of any entity which might be interested in collecting performance measurements on the network 100. For example, measurement management server(s) 3 may include a server of an entity managing the performance management service offered to the owner by the performance management application 10. Alternatively or in addition, the measurement management server(s) 3 may include a server of the network provider of the network 100. Alternatively or in addition, measurement management server(s) 3 may include a server of the entity providing the communication service offered by the user application A1. Alternatively or in addition, the measurement management server(s) 3 may include a server of the manufacturer of the user communication device 10.

With reference to the flow chart of FIG. 3, the operation of the performance measurement application 10 will be now described in greater detail.

At a first step 301, the owner management module 101 of the performance measurement application 10 receives from the owner of the user communication device 1 a performance measurement request whereby the owner of the device 1 requests to start a performance measurement on the packet flow exchanged by a user application run by the user communication device 1, for example the user application A1. As mentioned above, depending on the type of user communication device 1 (personal or business), the owner of the device 1 may coincide with the user of the device 1 or be a natural or legal person other than the user of the device 1. For example, the owner of the device 1 may be presented with a list of the user applications run by the device 1, including the user application A1. The owner may select the user application A1 from this list, such selection triggering transmission of a corresponding performance measurement request to the owner management module 101. The list may be presented to the owner of the device 1 in different ways, including a user interface UI of the device 1 (as shown in FIG. 1, applicable when the owner coincide with the user of the device 1) or a webpage by which the owner registers the device 1 (and other devices of its own, if any) to the performance measurement service offered by the performance measurement application 10.

If the user application A1 may exchange a single packet flow, selection of the user application corresponds to a selection of the packet flow to be measured. If instead the user application A1 may exchange multiple packet flows with the packet-switched communication network 100 (e.g. it is a browser), the owner may be presented with a list of selectable packet flows (e.g. the more frequently visited websites). The owner may select any of the listed websites (each corresponding to a respective packet flow), such selection triggering transmission of a corresponding performance measurement request to the owner management module 101.

At step 301, the owner management module 101 may also provide the owner with the possibility to simultaneously select all the packet flows of a user application and/or all the user applications run by the device 1. The owner management module 101 in this case may allow the owner to configure one or more filters which automatically exclude activation of any performance measurement on one or more user applications which comply with the filtering criterion or criteria. This allows the owner to guarantee that some packet flows are excluded from measurements e.g. for privacy or security reasons, for example for an e-banking application or for browsers when used in anonymous mode.

If multiple performance measurement types are supported by the marking field(s) MF in the packets Pk, Pk', the owner of the device 1 may also choose the type of performance measurement to be performed. For example, if the marking field(s) MF comprise a spin bit and/or Loss bit and/or Q bit and L bit in the QUIC headers of the packets Pk, Pk', the available performance measurements comprise an RTT measurement as disclosed by the above known Internet draft of B. Trammel et al., a round-trip packet loss measurement as disclosed by the above known Internet draft of M. Cociglio et al., or any of the one-way packet loss measurements as disclosed by the above known Internet draft of A. Ferrieux et al. Hence, the owner may choose amongst these performance measurements.

Then, upon reception of the performance measurement request, the marking management module 102 preferably activates a marking functionality on the selected packet flow Pk, Pk' (step 302).

When activated, the marking functionality provides for marking the upstream packets Pk originated by the user application A1 and for inducing the network node 2 to also mark the downstream packets Pk', so as to support the requested performance measurement on the packet flow Pk, Pk'. The marking of the upstream packets Pk and downstream packets Pk' are reciprocally consistent in that they support a same performance measurement on the packets Pk, Pk'.

The marking of the packets Pk, Pk' provides for appropriately setting the values of at least one measurement-dedicated field (also termed herein after "marking field") MF in the packets Pk, Pk'.

According to an embodiment, the marking functionality is embedded in the user application A1, namely the value of the marking field(s) MF in the upstream packets Pk may be set exclusively by the user application A1. This is the case, for example, when the marking field(s) MF of the packets Pk, Pk' are comprised in a header of a client-server protocol (such as QUIC), whose client is embedded in the user application A1 itself. In this case, at step 302 the marking management module 102 instructs the user application A1 to activate the marking functionality.

Otherwise (e.g. in case TCP is used as a transport layer protocol by the user application A1), the marking management module 102 may perform the marking functionality of its own, by appropriately setting the value of the relevant marking field(s) MF.

In order to induce the network node 2 originating the downstream packets Pk' to mark them consistently with the marking of the upstream packets Pk, different mechanisms may be used.

If, for example, the marking field(s) MF of the packets Pk, Pk' are comprised in a header of a client-server protocol (such as QUIC), whose client is embedded in the user application A1 itself and whose server is in the network node 2 originating the downstream packets Pk', the client in the user application A1 could instruct the server in the network node 2 to start the marking of the downstream packets Pk'. Such instructing may comprise transmission of an explicit marking instruction from client to server. Otherwise, the server at the network node 2 could be configured to permanently implement a reflection mechanism whereby it reflects the value of the marking field(s) MF in the received upstream packets Pk into the marking field(s) MF of corresponding downstream packets Pk'. In this case, as the client in the user application A1 starts marking the upstream packets Pk, the server in the network node 2 receives them and—by simply continuing to implement its reflection mechanism—automatically marks the downstream packets Pk' consistently with the marking of the upstream packets Pk.

According to other embodiments, the marking management module 102 may send a marking instruction to the network node 2, or negotiate the marking with it.

If the user application A1 exchanges multiple packet flows and the request of the owner relates to only one or some of them, at step 302 the marking functionality is preferably activated only for the selected packet flow(s). Further, if the marking field(s) MF of the packets Pk, Pk' supports different types of performance measurements and only one or some of them have been requested, the marking functionality may be activated only for the marking field(s)

that support the requested performance measurement type(s). For example, if the marking field(s) MF comprise the spin bit and/or Loss bit and/or Q bit and L bit in the QUIC headers of the packets Pk, Pk' and only a round-trip packet loss measurement as disclosed by the above known Internet draft of M. Cociglio et al. has been requested, at step 302 the marking functionality is activated only for the Loss bit in the QUIC header.

Upon activation of the marking functionality by the user application A1, the measurement module 103 preferably starts performing the requested performance measurement(s) on the packets Pk, Pk' (step 303). In particular, at step 303 the measurement module 103 detects the marked upstream packets Pk as transmitted by the network interface NI of the user communication device 1 and/or the marked downstream packets Pk' as received by the network interface NI of the user communication device 1. The measurement module 103 then provides one or more performance parameters (e.g. timestamps and/or counters) relating thereto and uses them to calculate a performance measurement.

If, for example, a round-trip packet loss measurement as disclosed by the above known Internet draft of M. Cociglio et al. has been requested, the measurement module 103 counts the number of transmitted upstream packets Pk with Loss bit equal to 1 in two consecutive trains of upstream packets Pk and calculates a round-trip packet loss based on such counts.

While the measurement is carried out, the owner management module 101 preferably provides the measurement results to the owner of the device 1 (step 304).

For example, the measurement results may be presented in the form of a table showing the result of the performance measurement on the selected packet flow (e.g. the round-trip packet loss, according to the considered example) as performed by the measurement module 103. If a measurement is periodically repeated, the results as displayed may be updated in near-real time, so as to provide the owner with an indication of the evolution in time (stability, fluctuations, etc.) of the performance. The measurement results may be presented to the owner of the device 1 in different ways, including a user interface UI of the device 1 itself (as shown in FIG. 1) or a webpage by which the owner has registered the device 1 (and other devices of its own, if any) to the performance measurement service offered by the performance measurement application 10.

If performance measurements have been requested for other packet flows of the same user application A1 or other user applications run by the device 1, such measurements are also displayed by the user interface UI. For example, if the user application A1 is a browser, the above-mentioned round-trip packet loss measurement results may be shown separately for every visited website, namely for each packet flow identified by a certain domain or IP address.

The sharing module 104 then preferably shares the measurement results provided by the performance measurement application 10 with the measurement management server 3 (step 305).

Preferably, the sharing of the measurement results requires a consent from the owner of the user communication device 1. The measurement management server 3 may request such consent for example when the owner registers the user communication device 1 to the performance measurement service offered by the performance measurement application 10.

Preferably, at step 305 the sharing module 104 completes the measurement results to be shared with the measurement management server 3 by adding information allowing to identify the user communication device 1 originating the measurement results and/or the packet flow(s) to which the measurement results pertain. Such information may include for example the destination address of the upstream packets Pk' and/or the source address of the downstream packets Pk' and/or the DNS (Domain Name System) of the user communication device 1 and/or geographic position and radio parameters of the user communication device 1 (if it is a mobile device). If the owner of the device 1 agrees, at step 305 the sharing module 104 may add further information, such as the DNS of the user application A1, the http request domain, the service type (videoconferencing, multimedia streaming, etc.).

The performance measurement application 10 then advantageously acts as a measurement point capable of monitoring any of (or even all) the packet flows that the user communication device 1 exchanges with the packet-switched communication network 100. Since, typically, the user communication device 10 makes use of a limited number of user applications exchanging a limited number of packet flows, the maximum number of packet flows to be measured by the performance measurement application 10 is also limited and can be managed by the computational resources that are typically available at the user communication device 1.

Hence, if the performance measurement application 10 were installed on several user communication devices connected to the packet-switched communication network 100, a corresponding number of measurement points would be available, which would provide to the measurement management server 3 performance measurements for several packet flows transmitted through the network 100. The performance measurement application 10 and the measurement management server 3 then form a performance measurement system capable of monitoring all the packet flows transmitted through the network 100, or at least a significant portion thereof, without requiring several complex measurement points to be deployed at the network nodes.

Optionally, the measurement management server 3 may further share the measurement results (preferably with the consent of the owner of the device 1) with other entities such as:

public institutions such as national or supranational telecommunication authorities, police and law enforcement (possibly also independently of the consent of the owner);

communication providers, service providers, content providers, DNS providers; and vendors of user communication devices, vendors of operating systems for user communication terminals, vendors of user applications.

The measurement management server 3 and/or any of the entities receiving the measurement results may use them for different purposes, including troubleshooting (detecting and solving congestions, failures and other problems which could arise in the network 100), optimization of the performance of user communication devices, check of SLAs (Service Level Agreement) compliance, or comparison between communication providers.

The invention claimed is:

1. A non-transitory computer-readable medium for a user communication device, said user communication device being provided with at least one user application for exchanging at least one packet flow with a packet-switched communication network, said computer-readable medium comprising instructions which, when executed by a processor of said user communication device, cause the processor of said user communication device to carry out a method comprising:

receiving from an owner of said user communication device a request for performing a performance measurement on said packet flow;

in response to said request, activating a marking functionality on said packet flow, said marking functionality comprising marking an upstream marking field of upstream packets of said packet flow transmitted from the user communication device to a network node of the packet-switched communication network, which is configured to originate downstream packets of said packet flow transmitted from the network node to the user communication device, said upstream packets including upstream user data and said upstream marking field, and inducing the network node of said packet-switched communication network configured to originate said downstream packets of said packet flow to mark a downstream marking field of said downstream packets transmitted from the network node to the user communication device, said downstream packets including downstream user data and said downstream marking field;

providing at least one performance parameter relating to said upstream marking field of said marked upstream packets as transmitted by said user communication device or said downstream marking field of said marked downstream packets as received by said user communication device based on detection of marked packets at said user communication device and, based on said at least one performance parameter, providing a performance measurement on said packet flow; and sharing said performance measurement with a measurement management server.

2. The non-transitory computer-readable medium according to claim 1, wherein said marking functionality is embedded in said user application and wherein the activating the marking functionality further comprises instructing said user application to activate said marking functionality.

3. The non-transitory computer-readable medium according to claim 1, wherein said marking functionality is implemented by said instructions.

4. The non-transitory computer-readable medium according to claim 1, wherein said marking said upstream packets of said packet flow comprises setting a value of at least one measurement-dedicated field in said upstream packets and said inducing a network node of said packet-switched communication network originating downstream packets of said packet flow to mark said downstream packets comprises inducing said network node to set the value of the at least one measurement-dedicated field in said downstream packets.

5. The non-transitory computer-readable medium according to claim 1, wherein said upstream packets and said downstream packets comprise at least two measurement-dedicated fields supporting at least two respective types of performance measurements and wherein receiving the request for performing the performance measurement further comprises receiving from said owner of said user communication device a request for performing a type of performance measurement selected amongst said at least two types of performance measurements and the activating the marking functionality and the providing the at least one performance parameter are performed on a measurement-dedicated field supporting the selected type of performance measurement.

6. The non-transitory computer-readable medium according to claim 1, wherein said user application is suitable for exchanging a plurality of packet flows and wherein the receiving the request comprises receiving from said owner of said user communication device a request for performing a performance measurement on at least one packet flow selected amongst said plurality of packet flows and the activating the marking functionality and the providing the at least one performance parameter are performed only for said selected at least one packet flow.

7. The non-transitory computer-readable medium according to claim 1, wherein the receiving the request further comprises receiving from said owner a request for performing a performance measurement on all the packet flows exchanged by all the user applications run by said user communication device and wherein the activating the marking functionality and the providing the at least one performance parameter are performed on all the packet flows exchanged by all the user applications run by said user communication device.

8. The non-transitory computer-readable medium according to claim 1, wherein the activating the marking functionality and the providing the at least one performance parameters are performed on all the packet flows exchanged by all the user applications run by said user communication device, except at least one packet flow complying with a filtering criterion selected by said owner.

9. The non-transitory computer-readable medium according to claim 1, wherein the sharing said performance measurement further comprises completing said shared performance measurement with information identifying at least one of said user communication device, said packet flow, and said user application.

10. The non-transitory computer-readable medium according to claim 1, comprising further instructions which, when executed by said processor of said user communication device, cause the processor of said user communication device to carry out the method further comprising:

sharing said performance measurement with said owner of said user communication device.

11. The non-transitory computer-readable medium according to claim 1, wherein said computer-readable medium is downloadable and installable on said user communication device upon request from said owner.

12. The non-transitory computer-readable medium according to claim 1, wherein said computer-readable medium is part of an operating system of said user communication device.

13. A method for performing a performance measurement on a packet-switched communication network by a user communication device, said user communication device being provided with at least one user application suitable for exchanging at least one packet flow with said packet-switched communication network, said method comprising:

receiving from an owner of said user communication device a request for performing a performance measurement on said packet flow;

in response to said request, activating a marking functionality on said packet flow, said marking functionality comprising marking an upstream marking field of upstream packets of said packet flow transmitted from the user communication device to a network node of the packet-switched communication network, which is configured to originate downstream packets of said packet flow transmitted from the network node to the user communication device, said upstream packets including upstream user data and said upstream marking field, and inducing the network node of said packet-switched communication network configured to originate said downstream packets of said packet flow to mark a downstream marking field of said downstream packets transmitted from the network node to the user communication device, said downstream packets including downstream user data and said downstream marking field;

providing at least one performance parameter relating to said upstream marking field of said marked upstream packets as transmitted by said user communication device or said downstream marking field of said marked downstream packets as received by said user communication device based on detection of marked packets at said user communication device and, based on said at least one performance parameter, providing a performance measurement on said packet flow; and sharing said performance measurement with a measurement management server.

14. A system for performing a performance measurement on a packet-switched communication network, said system comprising:

a measurement management server; and at least one user communication device provided with at least one user application suitable for exchanging at least one packet flow with said packet-switched communication network, said user communication device being further configured to:

receive from an owner of said user communication device a request for performing a performance measurement on said packet flow, in response to said request, activate a marking functionality on said packet flow, said marking functionality comprising marking an upstream marking field of upstream packets of said packet flow transmitted from the user communication device to a network node of the packet-switched communication network, which is configured to originate downstream packets transmitted from the network node to the user communication device, said upstream packets including upstream user data and said upstream marking field, and inducing the network node of said packet-switched communication network configured to originate said downstream packets of said packet flow to mark a downstream marking field of said downstream packets transmitted from the network node to the user communication device, said downstream packets including downstream user data and said downstream marking field, provide at least one performance parameter relating to said upstream marking field of said marked upstream packets as transmitted by said user communication device or said downstream marking field of said marked downstream packets as received by said user communication device based on detection of marked packets at said user communication device and, based on said at least one performance parameter, provide a performance measurement on said packet flow, and share said performance measurement with said measurement management server.

15. The non-transitory computer-readable medium according to claim 1, wherein the inducing the network node of said packet-switched communication network includes transmitting an instruction to the network node.

16. The non-transitory computer-readable medium according to claim 1, wherein the inducing the network node of said packet-switched communication network includes implementing a reflection function at the network node to reflect an upstream value of a marking field in an upstream packet into a downstream value of a marking field in a downstream packet.

* * * * *